United States Patent
Hayashi et al.

(10) Patent No.: US 8,142,947 B2
(45) Date of Patent: *Mar. 27, 2012

(54) START-UP METHOD FOR FUEL CELL

(75) Inventors: Masanori Hayashi, Utsunomiya (JP); Kenichiro Ueda, Utsunomiya (JP); Yoshio Hosono, Utsunomiya (JP); Minoru Uoshima, Utsunomiya (JP); Junji Uehara, Utsunomiya (JP); Tomoki Kobayashi, Utsunomiya (JP); Yuji Matsumoto, Shioya-gun (JP); Chihiro Wake, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/023,270

(22) Filed: Feb. 8, 2011

(65) Prior Publication Data

US 2011/0143244 A1    Jun. 16, 2011

(51) Int. Cl.
*H01M 8/04* (2006.01)

(52) U.S. Cl. ............ 429/429; 429/432; 429/442

(58) Field of Classification Search .................. None
See application file for complete search history.

(56) References Cited

U.S. PATENT DOCUMENTS

| | | | |
|---|---|---|---|
| 6,068,942 | A | 5/2000 | Strasser et al. |
| 6,960,401 | B2 | 11/2005 | Barton et al. |
| 7,282,286 | B2 | 10/2007 | Hayashi et al. |
| 2002/0076583 | A1 | 6/2002 | Reiser et al. |

FOREIGN PATENT DOCUMENTS

| | | |
|---|---|---|
| JP | 55-154076 | 12/1980 |
| JP | 56-114287 | 9/1981 |
| JP | 4-4570 | 1/1992 |
| JP | 11-97047 | 4/1999 |
| JP | 2000-512069 | 9/2000 |
| JP | 2001-313055 | 11/2001 |

(Continued)

OTHER PUBLICATIONS

Japanese Office Action for Application No. 2003-363593, dated Jun. 26, 2007.

(Continued)

*Primary Examiner* — Jonathan Crepeau
(74) *Attorney, Agent, or Firm* — Nelson Mullins Riley & Scarborough LLP; Anthony A. Laurentano

(57) ABSTRACT

A start-up method for a fuel cell system that includes a fuel cell that carries out power generation by the electrochemical reaction between a fuel gas and the oxygen gas in the air; a fuel gas discharge path and a fuel gas supply path that are connected to the fuel cell; a fuel gas circulation path in which the fuel gas discharge path merges with the fuel gas supply path; and a purge valve provided on the fuel gas circulation path in order to discharge the circulating fuel gas from the fuel gas circulation path. The method includes the steps of opening the purge valve at the same time that the fuel gas is supplied to the fuel cell and replacing the nitrogen gas that originates in the air and is present in the fuel gas circulation path by fuel gas; and closing the purge valve after the nitrogen gas in the fuel gas circulation path has been replaced by the fuel gas.

2 Claims, 11 Drawing Sheets

FOREIGN PATENT DOCUMENTS

| | | |
|---|---|---|
| JP | 2002-216812 | 8/2002 |
| JP | 2002-313390 | 10/2002 |
| JP | 2002-329521 | 11/2002 |
| JP | 2003-331888 | 11/2003 |
| JP | 2003-331889 | 11/2003 |
| JP | 2004-296351 | 10/2004 |

OTHER PUBLICATIONS

Japanese Office Action for Application No. 2003-363593, dated Dec. 19, 2008.

Japanese Office Action for Application No. 2003-363593, dated Apr. 6, 2010.

START-UP METHOD FOR FUEL CELL

BACKGROUND OF THE INVENTION

1. Field of the Invention

The present invention relates to a start-up method for a fuel cell system that can improve the start-up performance.

Priority is claimed on U.S. patent application Ser. No. 11/805,182, filed May 21, 2007 now U.S. Pat. No. 7,910,254; U.S. patent application Ser. No. 10/723,622, filed Nov. 25, 2003 now U.S. Pat. No. 7,282,286; Japanese Patent Application No. 2002-346335, filed Nov. 28, 2002; Japanese Patent Application No. 2002-347667, filed Nov. 29, 2002; and Japanese Patent Application No. 2003-363593, filed Oct. 23, 2003, the contents of which are incorporated herein by reference.

2. Description of Related Art

A fuel cell is known in which an anode and a cathode are provided that have a solid polymer electrolyte membrane interposed therebetween, a fuel gas (for example, hydrogen gas) is supplied to the anode, an oxidizing gas (for example, air) is supplied to the cathode, and chemical energy that is produced during the oxidation-reduction reaction between these reacting gases is extracted directly as electrical energy.

In such a fuel cell, generally in order to increase the fuel utilization rate and thereby improve the fuel economy, a fuel circulation path is formed so that an unreacted hydrogen gas, i.e., a hydrogen gas that has not been consumed, that is extracted from the fuel cell is recycled, mixed with fresh fuel gas, and supplied again to the fuel cell.

A technology is known in which, when stopping these fuel cells, the supply of hydrogen gas is stopped after the supply of air is stopped, and thereby power generation action does not occur during the stoppage due to the reacting gases that remain in the fuel cells after the stoppage (for example, refer to Published Japanese Translation No. 2000-512069 of the PCT International Application).

However, even though the power supply to the external load is cut off during the stoppage of the fuel cell, reacting gases remaining in the system are consumed due to the oxidizing reaction caused by the catalysis of the anode and cathode. That is, air remains in the oxidizing agent supply system and hydrogen remains in the fuel circulation system, and these residual reacting components are gradually consumed depending on the duration of the fuel cell stoppage. However, although the oxygen gas in the air is consumed, the nitrogen gas remains in the system. Thus, the partial pressure of the nitrogen gas on the cathode side increases and the pressure in the hydrogen circulation system decreases. Thereby, the nitrogen gas passes through the solid polymer electrolyte membrane to leak to the anode side as well, and penetrates into the circulation system of the fuel cell.

However, as described above, when the nitrogen gas penetrates into the circulation system of the fuel cell, during start-up, when the reacting gases, and in particular hydrogen gas, are supplied, a problem is encountered in that the reaction does not occur smoothly when the reacting gases are supplied into the fuel cells due to the interference of the nitrogen gas present in the hydrogen circulation system.

In particular, in the case in which the fuel cell is for a vehicle, when nitrogen gas in the air penetrates into the system as described above, the start-up of the fuel cell takes time, and thus there are the problems that the starting performance of the fuel cell vehicle is degraded and the marketability thereof is reduced. In addition, depending on how the atmospheric pressure fluctuates with the passage of time after stoppage of the fuel cell system, contrariwise, the case in which the pressure in the anode falls below atmospheric pressure must also be considered. When the pressure falls below atmospheric pressure, there are cases in which impure gases flow back to the anode side, and this interferes with the smooth starting of the fuel cell.

SUMMARY OF THE INVENTION

Thus, in consideration of the problems described above, it is an object of the present invention to provide a start-up method for a fuel cell system that can carry out a smooth start-up.

In order to solve the problems described above, the present invention provides a start-up method for a fuel cell system that includes a fuel cell that carries out power generation by the electrochemical reaction between a fuel gas and the oxygen gas in the air; a fuel gas discharge path and a fuel gas supply path that are connected to the fuel cell; a fuel gas circulation path that connects the fuel gas discharge path to the fuel gas supply path; and a purge valve provided on the fuel gas circulation path in order to discharge the circulating fuel gas from the fuel gas circulation path, the method including the steps of: supplying the fuel gas to the fuel cell and opening the purge valve so that the nitrogen gas that originates in the air and is present in the fuel gas circulation path is replaced by the fuel gas; and closing the purge valve after the nitrogen gas in the fuel gas circulation path has been replaced by the fuel gas.

According to the method described above, by opening the purge valve when the fuel gas is supplied, the nitrogen gas in the system on the fuel gas side, which is very detrimentally influenced in particular by nitrogen gas, is discharged, and the purge valve is closed after the fuel gas has been supplied and the fuel gas has filled the fuel cell. Thereby, the fuel gas is not needlessly used, and it is possible to prevent the time to start the power generation from becoming long due to the interference of the nitrogen gas remaining in the fuel gas circulation path. Therefore, when the fuel cell used in a vehicle, the starting performance is improved, which is advantageous.

The timing at which the purge valve is closed may be determined depending on the duration of the fuel cell stoppage.

According to the method described above, the longer the duration of the fuel cell stoppage, the longer the timing of the closure of the purge valve is delayed, and thereby it is possible to guarantee the time during which the nitrogen gas has been replaced by the fuel gas. Therefore, there is the effect that the purge valve can be accurately closed at the point in time that the residual nitrogen gas in the fuel gas circulation path is replaced by the fuel gas. This point in time is determined depending on the duration of the fuel cell stoppage.

The duration of the fuel cell stoppage may be estimated based on the temperature of the fuel cell or the voltage in the fuel cell.

According to the method described above, by focusing on the fact that the longer the duration of the fuel cell stoppage, the lower the temperature of the fuel cell becomes and the lower the generated voltage becomes, it is possible to estimate accurately the duration of the fuel cell stoppage, this time being determined by the amount of nitrogen gas that is to be replaced by the fuel gas.

The timing at which the purge valve is closed may also be determined depending on the concentration of the fuel gas included in the discharge gas from the fuel gas circulation path.

According to the method described above, by focusing on the fact that the more the nitrogen gas is replaced by the fuel gas, the higher the concentration of the fuel gas in the fuel gas circulation path becomes, it is possible to determine the timing at which the purge valve is closed, and thus fuel gas is not needlessly used, and it is possible to prevent the time until the start of power generation from becoming long due to the interference of the nitrogen gas remaining in the fuel gas circulation path. Therefore, when the fuel cell used in a vehicle, the starting performance is improved, which is advantageous.

The present invention further provides a start-up method for a fuel cell system that includes a fuel cell that carries out power generation by the electrochemical reaction between a fuel gas and the oxygen gas in the air; a fuel gas discharge path and a fuel gas supply path that are connected to the fuel cell; a fuel gas circulation path that connects the fuel gas discharge path to the fuel gas supply path; and a purge valve provided on the fuel gas circulation path in order to discharge the circulating fuel gas from the fuel gas circulation path, the method including the steps of: starting the supply of fuel gas to the fuel cell; opening the purge valve after the supplying the fuel gas starts for only a time determined depending on the estimated duration of the fuel cell stoppage; and closing the purge valve.

According to the method described above, the purge valve is opened for a time depending on the estimated duration of the fuel cell stoppage after the fuel gas has been supplied, and thereby nitrogen gas in the system on the fuel gas side is discharged, and the purge valve is closed after the fuel cell has been filled with fuel gas. Thereby, the fuel gas is not needlessly used, and it is possible to prevent the time until the power generation from becoming long due to the interference of the nitrogen gas remaining in the fuel gas circulation path. Therefore, when the fuel cell used in a vehicle, the starting performance is improved, which is advantageous.

The estimated duration of the fuel cell stoppage can also be estimated depending on the temperature of the fuel cell or the voltage of the fuel cell.

According to the method described above, by focusing on the fact that the longer the duration of the fuel cell stoppage, the lower the temperature of the fuel cell becomes and the lower the generated voltage becomes, it is possible to estimate accurately the estimated duration of the fuel cell stoppage.

The present invention further provides a start-up method for a fuel cell system that includes a fuel cell that carries out power generation by the electrochemical reaction between a fuel gas and the oxygen gas in the air; a fuel gas discharge path and a fuel gas supply path that are connected to the fuel cell; a fuel gas circulation path that connects the fuel gas discharge path to the fuel gas supply path; and a purge valve provided on the fuel gas circulation path in order to discharge the circulating fuel gas from the fuel gas circulation path, the method including the steps of: starting the supply of the fuel gas to the fuel cell; opening the purge valve after the start of the supplying of the fuel gas; and closing the purge valve depending on the concentration of the fuel gas included in the discharge gas from the fuel gas circulation path.

According to the method described above, by focusing on the fact that the more the fuel gas is supplied to the fuel cell, the more the concentration of the fuel gas in the fuel gas circulation path increases, it is possible to determine the timing at which the purge valve is closed. Thereby, the fuel gas is not needlessly used, and it is possible to prevent the time until the power generation from becoming long due to the interference of the nitrogen gas remaining in the fuel gas circulation path. Therefore, when the fuel cell used in a vehicle, the starting performance is improved, which is advantageous.

The power generation of the fuel cell may also be started after the closing of the purge valve.

According to the method described above, while the fuel gas has filled the system on the fuel gas side, it is possible to start the power generation of the fuel cell, and thus when the fuel cell used in a vehicle, the starting performance is improved, which is advantageous.

The timing at which the purge valve is closed may also be determined depending on the pressure in the fuel gas circulation path or the voltage of the fuel cell.

According to the method described above, by focusing on the facts that the longer the duration of the fuel cell stoppage, the lower the generated voltage becomes, and in the case in which the duration of the fuel cell stoppage is comparatively short the pressure in the fuel gas circulation path becomes lower because the remaining hydrogen reacts with the oxygen present in the oxygen gas system, and when the duration of the fuel cell stoppage becomes comparatively long, the nitrogen gas remaining in the oxygen gas system diffuses back into the fuel gas system, and thereby it is possible to estimate with high precision the estimated duration of the fuel cell stoppage. Therefore, it is possible to discharge nitrogen gas from the system on the fuel gas side and fill the system with the fuel gas. At the same time, the fuel gas is not needlessly used, and it is possible to prevent the time until the power generation starts from becoming long due to the interference of the nitrogen gas remaining in the fuel gas circulation path. Therefore, when the fuel cell used in a vehicle, the starting performance is improved, which is advantageous.

The present invention further provides a start-up method for a fuel cell system that includes a fuel cell that carries out power generation by the electrochemical reaction between a fuel gas and the oxygen gas in the air; a fuel gas discharge path and a fuel gas supply path that are connected to the fuel cell; a fuel gas circulation path that connects the fuel gas discharge path to the fuel gas supply path; and a purge valve provided on the fuel gas circulation path in order to discharge the circulating fuel gas from the fuel gas circulation path, the method including the step of: supplying the fuel gas to the fuel cell; measuring the pressure in the fuel gas circulation path while the supplying of the fuel gas is in progress; and setting an opening start timing of the purge valve depending on the measured value of the pressure.

According to the method described above, it is possible to set the opening start time of the purge valve depending on the measured value of the pressure, and thus it is possible to prevent the backflow of impure gases in the air and the like into the fuel gas circulation path, and it is possible to carry out the purging of the fuel gas in the fuel gas circulation path smoothly. Therefore, before the power generation start by the fuel cell, it is possible to eliminate efficiently the impure gas remaining in the fuel gas circulation path of the fuel cell, and thus it is possible to carry out start-up (power generation start) of the fuel cell smoothly.

The method described above may further include the step of: opening the purge valve after the opening start timing of the purge valve; and closing the purge valve after the nitrogen gas that originates in the air and is present in the fuel gas circulation path has been replaced by the fuel gas.

According to the method described above, it is possible to prevent the backflow of impure gases in the air and the like into the fuel gas circulation path and it is possible to carry out purging of the fuel gas in the fuel gas circulation path smoothly. At the same time, due to the supply of the fuel gas and the opening of the purge valve, nitrogen gas in the system on the fuel gas side is discharged, where the detrimental influence of the nitrogen gas in particular is strong, and the purge valve is closed after the fuel gas is supplied and the fuel gas fills the fuel cell. Therefore, it is possible to carry out purging of the fuel gas in the fuel gas circulation path smoothly, and before the power generation start by the fuel cell, it is possible to prevent the backflow of impure gases in the air and the like into the fuel gas circulation path and it is possible to eliminate efficiently the impure gases that remain in the fuel gas circulation path of the fuel cell. In addition, it is possible to replace impure gases in the fuel gas circulation path with high concentration fuel gas, and it is possible to carry out the start-up (power generation start) of the fuel cell smoothly.

The present invention further provides a start-up method for a fuel cell system that includes a fuel cell that carries out power generation by the electrochemical reaction between a fuel gas and the oxygen gas in the air; a fuel gas discharge path and a fuel gas supply path that are connected to the fuel cell; a fuel gas circulation path that connects the fuel gas discharge path to the fuel gas supply path; and a purge valve provided on the fuel gas circulation path in order to discharge the circulating fuel gas from the fuel gas circulation path, the method including the steps of: supplying the fuel gas to the fuel cell; measuring the pressure in the fuel gas circulation path while the supplying of the fuel cell is in progress; determining whether the measured value of the pressure is equal to or greater than a predetermined value; and opening the purge valve when the measured value of the pressure becomes equal to or greater than a predetermined value.

According to the method described above, when fuel gas is supplied to the fuel cell and when the measured value of the measured pressure of the fuel gas circulation path becomes equal to or less than a predetermined value, the purge valve is opened, and thereby it is possible to prevent the backflow of impure gases of the air or the like into the fuel gas circulation path, and it is possible to carry out purging of the fuel gas in the fuel gas circulation path smoothly. At the same time, the fuel gas is not needlessly used, and it is possible to prevent the time until the power generation from becoming long due to the interference of the nitrogen gas remaining in the fuel gas circulation path. Therefore, when the fuel cell used in a vehicle, the starting performance is improved, which is advantageous.

The method described above may further include the step of: closing the purge valve after the nitrogen gas that originates in the air and is present in the fuel gas circulation path has been replaced by the fuel gas after the opening of the purge valve.

According to the method described above, it is possible to prevent the backflow of the impure gas in the air or the like into the fuel gas circulation path and it is possible to carry out purging of the fuel gas in the fuel gas circulation path smoothly. At the same time, due to the supply of the fuel gas and the opening of the purge valve, the nitrogen gas on the fuel gas system side, which is detrimentally influenced by the nitrogen gas, is discharged, and the purge valve is closed after the fuel gas has been supplied and the fuel gas fills the fuel cell. Therefore, it is possible to prevent the time until the power generation from becoming long, and when the fuel cell used in a vehicle, the starting performance is improved, which is advantageous.

In addition, the present invention provides a start-up method for a fuel cell system that includes a fuel cell that carries out power generation by the electrochemical reaction between a fuel gas and the oxygen gas in the air; a fuel gas discharge path and a fuel gas supply path that are connected to the fuel cell; a fuel gas circulation path that connects the fuel gas discharge path to the fuel gas supply path; and a purge valve provided on the fuel gas circulation path in order to discharge the circulating fuel gas from the fuel gas circulation path, the method including the step of: setting the timing of the opening and closing of the purge valve depending on the estimated duration of the fuel cell stoppage.

According to the method described above, depending on the estimated duration of the fuel cell stoppage, the purge valve is opened such that the backflow of impure gases in the air and the like into the fuel gas circulation path is prevented and the purge valve is closed after the fuel gas is supplied and the fuel gas fills the fuel cell, and thus it is possible to carry out the start-up quickly.

DETAILED DESCRIPTION OF THE INVENTION

Figure 1:
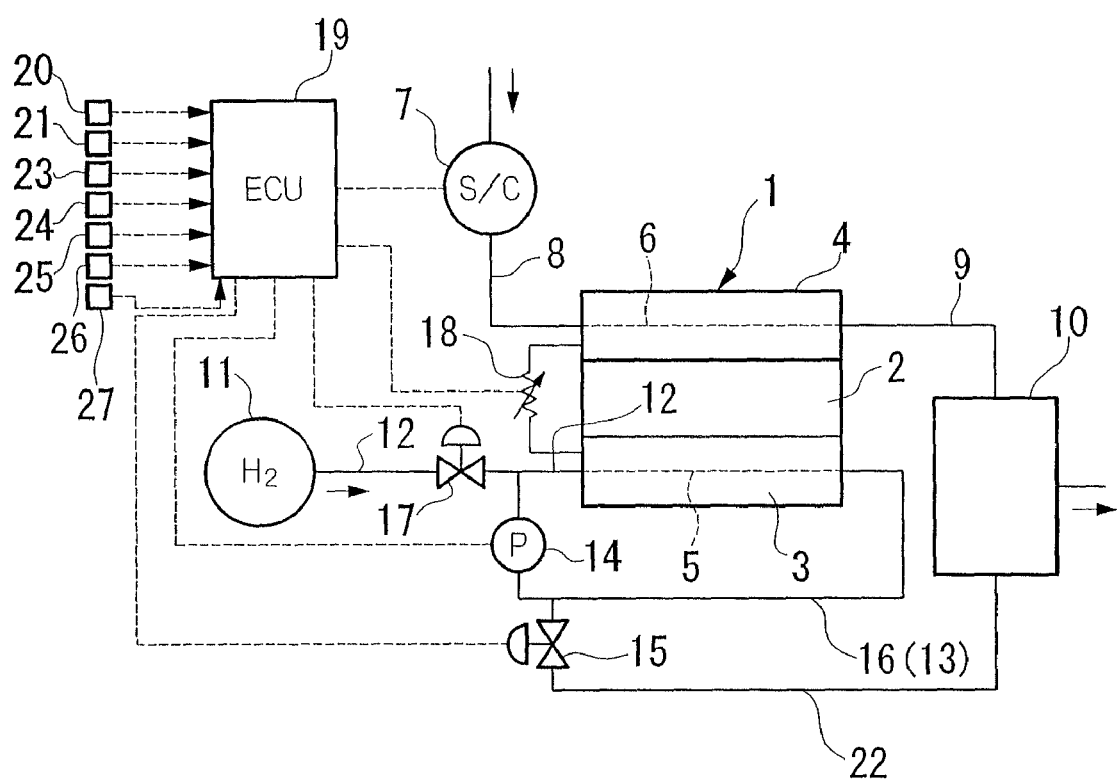
FIG. 1 is a schematic structural drawing of the fuel cell system mounted in a fuel cell vehicle according to an embodiment of the present invention.

Below, the embodiments of the present invention will be explained with reference to the drawings. FIG. 1 is a schematic structural drawing showing the fuel cell system mounted on a fuel cell vehicle.

The fuel cell 1 is formed by stacking in plurality cells that are formed by interposing a solid polymer electrolyte membrane 2 consisting of, for example, a solid polymer ion exchange membrane, interposed between an anode 3 and a cathode 4 (only a single cell is shown in FIG. 1), hydrogen gas is supplied as fuel gas to the reacting gas path 5 of the anode 3, and air that includes oxygen gas is supplied as oxidizing gas to the reacting gas path 6 of the cathode 4. Then hydrogen ions generated by the catalytic reaction at the anode 3 pass though the solid polymer electrolyte membrane 2 and migrate to the cathode 4. At the cathode 4, power is generated due to the electrochemical reaction with the oxygen, and water is generated. A portion of the generated water produced at the cathode side diffuses back to the anode side via the solid polymer electrolyte membrane 2, and thus generated water is present on the anode side as well.

The air is pressurized to a predetermined pressure by a compressor 7, such as a supercharger (S/C), and supplied to the reacting gas path 6 of the cathode 4 of the fuel cell 1 by passing through the air supply path 8. After the air supplied to the fuel cell 1 been provided for power generation, it is discharged from the fuel cell 1 to the air discharge path 9 along with the generated water on the cathode side, and introduced into the discharge gas processing device 10. Below, the air supplied to the fuel cell 1 will be called the supplied air and the air discharged form the fuel cell 1 will be called the discharged air.

At the same time, the hydrogen gas supplied from the hydrogen tank ($H_2$) 11 is supplied to the reacting gas path 5 of the anode 3 of the fuel cell 1 by passing through the oxygen gas supply path (fuel gas supply path). Next, the unreacted hydrogen gas, i.e., hydrogen gas that has not been consumed, is discharged to the hydrogen gas circulation path (fuel gas circulation path) 13 via the hydrogen gas discharge path (fuel gas discharge path) 16 connected to the anode side along with the generated water on the anode side, and then merges with the hydrogen gas supply path 12 through a hydrogen pump 14 provided on the hydrogen gas circulation path 13. That is, the hydrogen gas discharged from the fuel cell 1 merges with fresh hydrogen gas supplied from the hydrogen tank 11 and is supplied again to the reacting gas path 5 of the anode 3 of the fuel cell 11.

From the hydrogen gas circulation path 13, the hydrogen gas purging path 22 provided on the purge valve 15, which is a discharge valve, bifurcates, and the hydrogen gas purge path 22 connects to the discharge path processing device 10. In the discharge gas processing device 10, the discharge air discharged from the air discharge path 9 of the fuel cell 1 and the hydrogen gas discharged from the hydrogen gas purge path 22 undergo a dilution process and are discharged. Note that reference numeral 17 denotes a cut-off valve that cuts off the hydrogen gas supplied from the hydrogen tank 11, and reference numeral 18 denotes a motor (external load) for running a vehicle that is driven by the electrical energy of the fuel cell 1. Here, the purge valve 15 is periodically opened in order to discharge water in the fuel cell 1 that has been generated by the electrochemical reaction, or to when the power generation voltage (for example, the cell voltage) of the fuel cell 1 declines.

The fuel cell 1 includes, for example, a cooling water circulation path and a water pump that circulates a coolant in this circulation path, and the temperature of the fuel cell 1 is controlled to as to reach a temperature (for example, 70° C.) that is suitable for electrochemical reactions.

The fuel cell 1 is controlled by an ECU 19, which is a control unit, and in order to realize this control, a signal from a coolant water temperature sensor 20 that measures the temperature of the coolant water in the fuel cell 1 is input into the ECU 19, and control of the rotation rate of the compressor 7, the rotation rate of the water pump 14, the opening and closing of the cut-off valve 17, and the opening and closing of the purge valve 15 is carried out. In addition, the ECU 19 inputs signals from the cell voltage sensor 21 of the fuel cell 1, the current sensor 23 that measures the power generation current, the voltage sensor 24 that measures the total voltage (voltage of all cells) of the fuel cell 1, a hydrogen sensor 25, an anode pressure sensor 26, and the ignition switch 27. Note that the voltage sensor 21 is a sensor that measures the voltage of each of the cells, the hydrogen sensor 25 is a sensor that measures the hydrogen concentration and is provided in the discharge gas processing device 10, and the anode pressure sensor 26 is a sensor that measures the pressure in the system on the fuel gas side of the fuel cell 1. In the present embodiment, the pressure in the hydrogen gas circulation path 13 is measured by the anode pressure sensor 26 as the system on the fuel gas side.

Next, the start-up process of the fuel cell system will be explained with reference to the flowchart in FIG. 2. This process is the process that is executed from the time that the ignition switch 27 of a fuel cell vehicle is turned ON until power generation starts.

In step S01, when the cut-off valve 17 is opened and the hydrogen supply begins, the purge valve 15 opens, and the water pump 14 is driven as necessary. Then the processing proceeds to step S02.

In step S02, it is determined whether a time limit has been reached. When the result of the determination is "YES", the processing proceeds to step S07, and when the result of the determination is "NO", the processing proceeds to step S03. In step S07, it is determined that the hydrogen sensor 25 has been failed, the purge valve 15 is closed in step S08, and the processing ends. This determination is made because it is considered that the hydrogen gas concentration is judged to be low in step S05 described even when the time limit has been exceeded due to failure of the hydrogen sensor 25.

Figure 3:
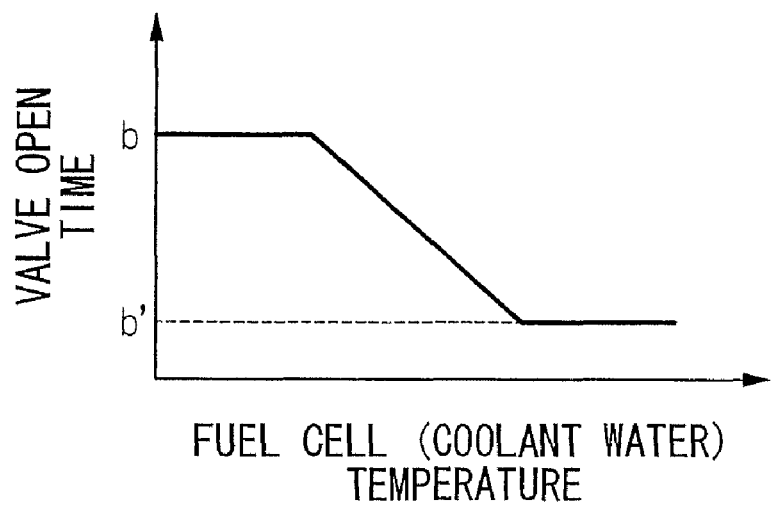
FIG. 3 is a graph of the first embodiment of the present invention.
Figure 4:
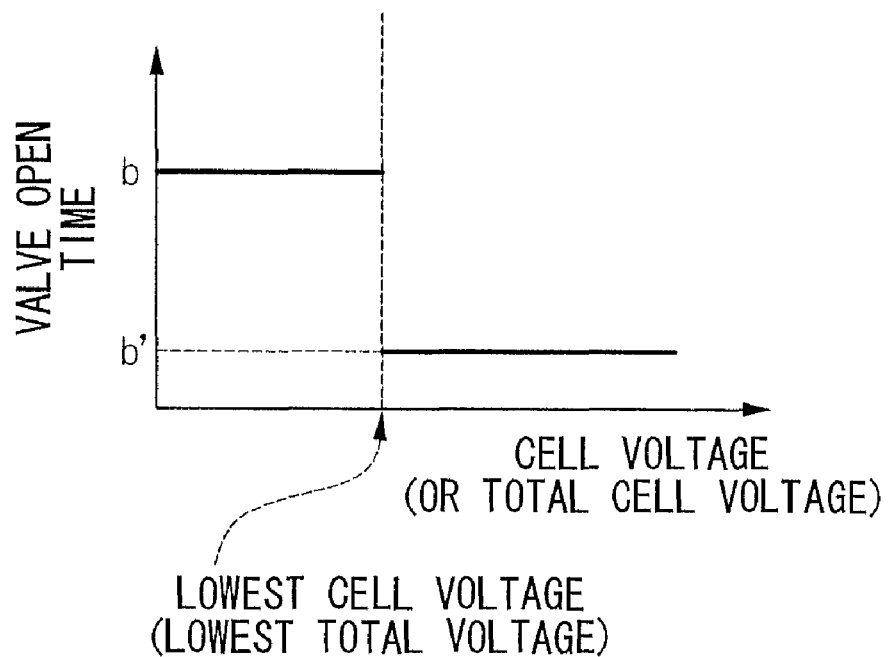
FIG. 4 is a graph of another mode of the first embodiment of the present invention.

In step S03, the calculation of the valve open time of the purge valve 15 depending on the temperature of the fuel cell 1 is carried out, and the processing proceeds to step S04. This calculation is carried out by reading the map values shown in FIG. 3. In this map, where the abscissa denotes the fuel cell (coolant water) temperature and the ordinate denotes the valve open time of the purge valve 15, the temperature is in a fixed range, and the higher the temperature, the shorter the valve open time is set. Note that instead of the fuel cell temperature, the cell voltages (total voltage) of the fuel cell 1 can also serve as a parameter for setting the valve open time. In this case, as shown in FIG. 4, it is possible to carry out a setting (b→b' in FIG. 5) such that the valve open time of the purge valve 15 becomes short when the cell voltage sensor 21 (voltage sensor 24) detects that the cell voltages (total voltage) exceed a minimum cell voltage (or minimum total voltage).

In this manner, the duration of the fuel 1 stoppage is estimated based on the coolant water temperature of the fuel cell 1 or the cell voltages (total cell voltage) of the fuel cell 1, and the timing at which the purge valve 15 is closed is determined based on this estimated stoppage duration. That is, the longer the duration of the fuel cell 1 stoppage, the lower the temperature or the voltage of the fuel cell 1, and thus remaining hydrogen gas and oxygen gas in the air react and an equivalent amount of nitrogen gas remains in the oxygen gas circulation path 13. Thus, it is necessary to set a long valve open time for the purge valve 14.

In step S04, it is determined whether the time that has passed from the opening of the purge valve 15 has exceeded the time calculated in step S03. When the result of the determination is "YES", the time has been exceeded, and the processing proceeds to step S08. When the result of the determination is "NO", the time has not been exceeded and the processing proceeds to step S05. Note that this calculated time is set such that the hydrogen gas concentration does not become equal to or greater than a predetermined value.

In step S05, it is determined whether the hydrogen gas concentration measured by the hydrogen sensor 25 has exceeded a predetermined value. When the result of the determination is "YES", the predetermined value has been exceeded, and the processing proceeds to step S08. When the result of the determination is "NO", the predetermined value has not been exceeded, the processing proceeds to step S06, and the state in which the purge valve 15 is opened is maintained. This determination is made because it is considered that, when the hydrogen gas concentration has exceeded a predetermined value, the nitrogen gas has been sufficiently replaced by the hydrogen gas.

Therefore, when the cut-off valve 17 is opened and the hydrogen gas is supplied from the hydrogen tank 11 and the purge valve 15 is opened, the temperature of the fuel cell 1 becomes to a certain extent higher, and in the case in which the hydrogen gas concentration in the discharge gas processing device 10 measured by the hydrogen sensor 25 becomes high, the nitrogen gas in the fuel cell 1 is sufficiently discharged, and it is determined that the nitrogen gas in the hydrogen gas circulation path 13 can be replaced by the hydrogen gas. Thus, by closing the purge valve 15 at this point in time, hydrogen gas is not consumed needlessly, and it is possible to start-up the fuel cell 1 in a short time. Thereby, a superior starting performance of the fuel cell vehicle can be achieved.

Figure 2:
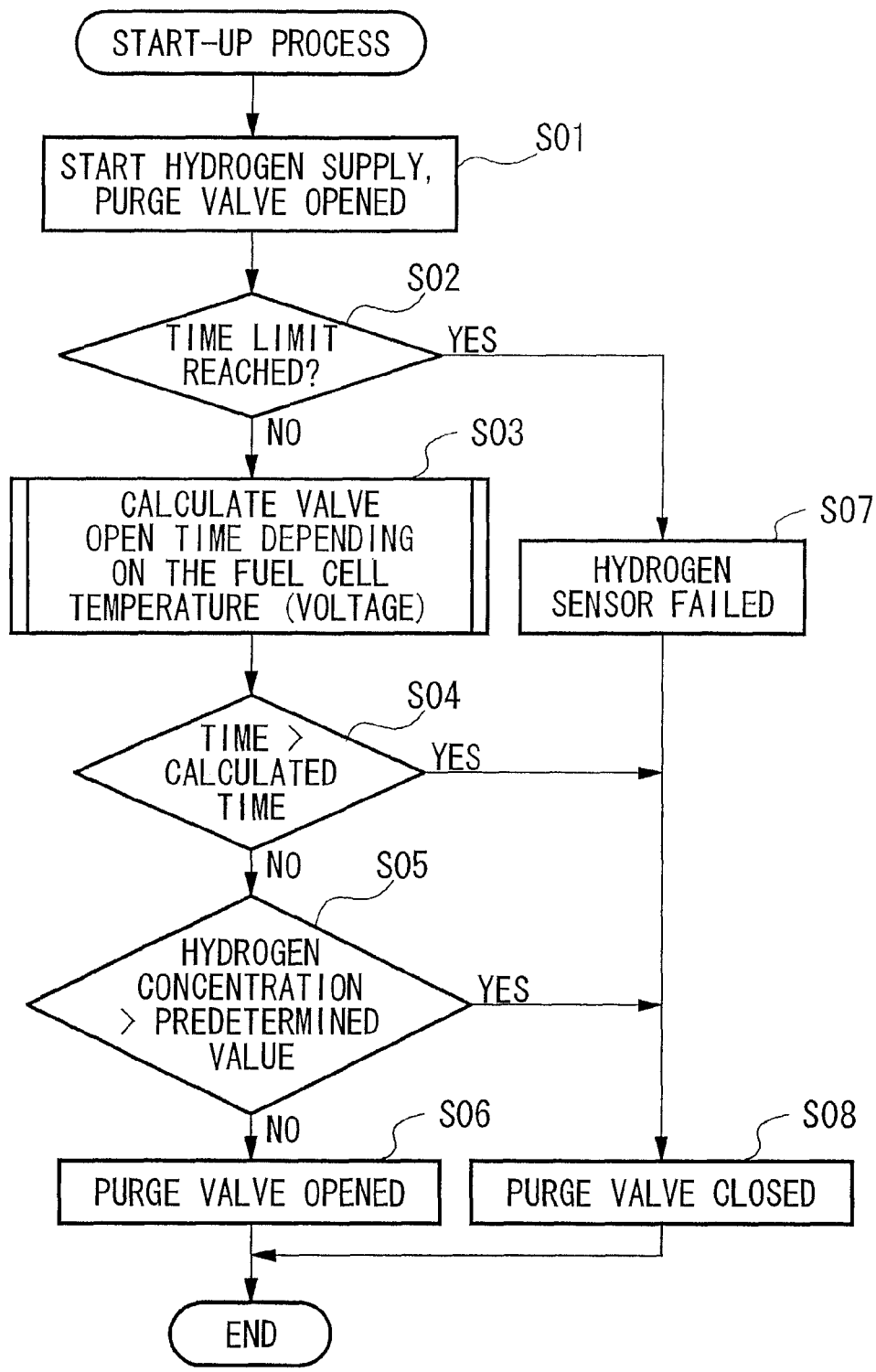
FIG. 2 is a flowchart showing the start-up process of the fuel cell mounted in a fuel cell vehicle according to a first embodiment of the present invention.
Figure 5:
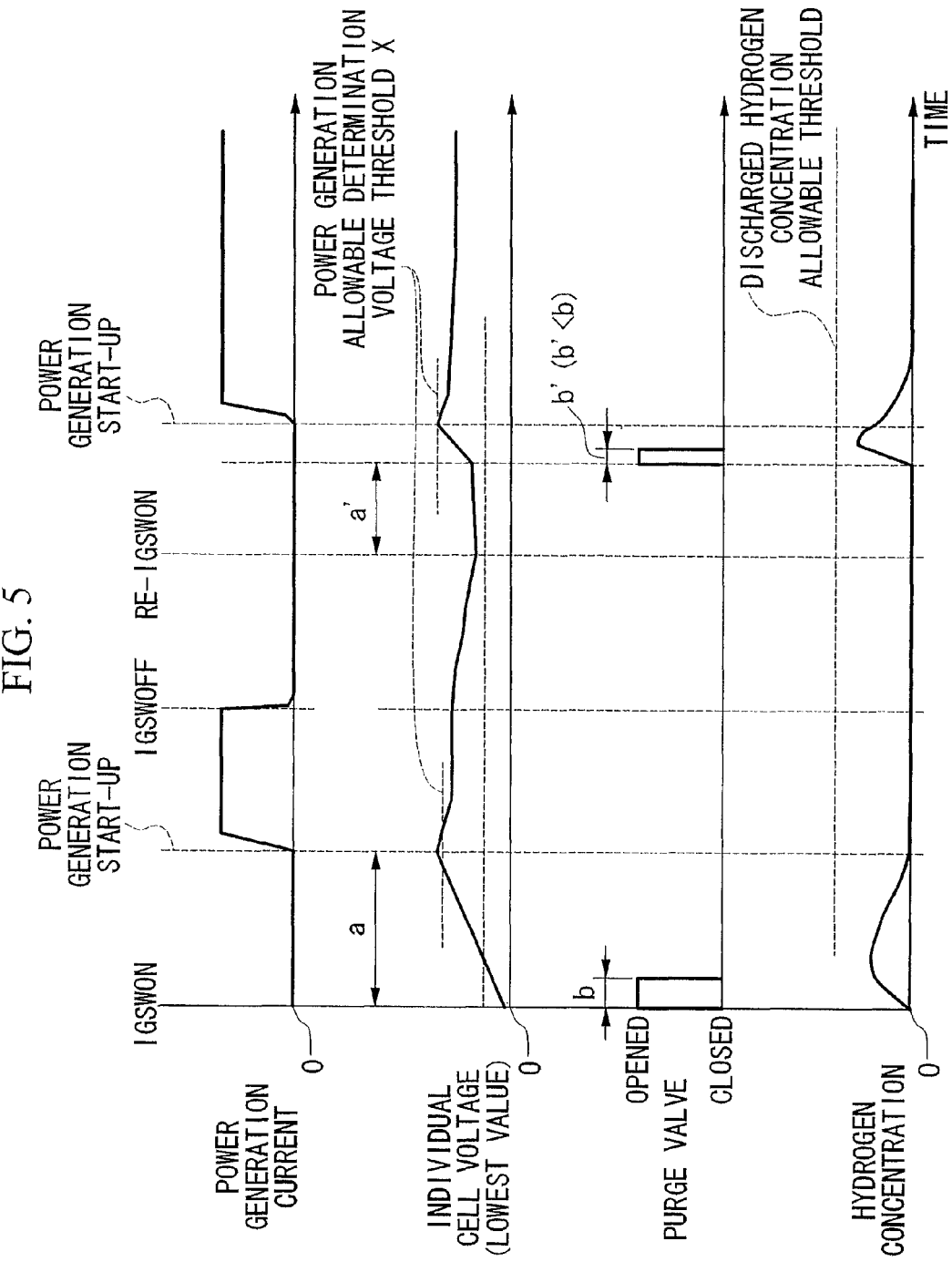
FIG. 5 is a timing chart of the first embodiment of the present invention.

FIG. 5 shows a timing chart corresponding to FIG. 2 for the first embodiment of the present invention. In this figure, when the ignition switch 27 is turned ON (IGSWON), the fuel cell 1 carries out no-load running (duration "a"). In this type of running, the fuel cell 1 is not connected to an electric load such as the motor 18, and here, a check of the no-load voltage is carried out. By driving a compressor 7 using the power from a power storage device such as a battery or capacitor provided separately as a secondary power source, air, which is the oxidizing agent gas, is supplied along with the oxygen gas. Thereby, during the no-load running, generated current does not flow to the load.

Here, immediately after the ignition switch 27 has been turned ON (IGSWON), the supply of hydrogen gas and air is carried out and the purge valve 15 is opened. Thereby, the hydrogen gas concentration in the discharge gas processing device 10 is increased. That is, after the nitrogen gas in the fuel cell 1 has been completely discharged, the hydrogen gas concentration begins to rise. Subsequently, the purge valve 15 is closed after a certain time (for example, duration "b") calculated according to the temperature of the cooling water or the cell voltages (total voltage) of the fuel cell 1. Then the hydrogen gas concentration becomes reduced due to the no-load running, during which the portion of the supplied oxygen gas is consumed by reaction. Note that the duration "b" denotes the line on the upper side shown in FIG. 3 and FIG. 4.

In addition, when the cell voltage reaches the power generation allowable determination voltage threshold X, the fuel cell 1 is connected to the load such as the motor 18, and power generation starts. Thereby, generated current is produced, and the cell voltages (total voltage) are reduced to some extent. Then the ignition switch 27 is turned OFF (IGSWOFF), and power generation stops.

Next, the ignition switch 27 is turned on again (Re-IGSWON), and after the passage of the no-load running of a certain time (duration a'), the purge valve 15 is closed after a certain time (for example, duration b' (b'<b)) calculated depending on the temperature of the coolant water or the cell voltages (total voltage) in the fuel cell 1. Then the hydrogen gas concentration is reduced due to the no-load running, in which a portion of the supplied hydrogen gas is consumed by reacting. Note that this duration b' denotes a line on the lower side shown in FIG. 3 and FIG. 4. In addition, when the cell voltage has reached the power generation allowable determination voltage threshold X, power generation starts.

Therefore, during such a restart-up, the nitrogen gas does not penetrate very much into the hydrogen gas circulation path 13, and thus the opening starting time for the purge valve 15 becomes short (b'<b), the hydrogen gas is not needlessly discharged, and it is possible to start the power generation more quickly. Note that, as shown in FIG. 5, the hydrogen gas concentration is suppressed so as to be equal to or less than the discharge hydrogen concentration allowable threshold.

Here, the duration of the fuel cell 1 stoppage of the present embodiment denotes the time from turning OFF (IGSWOFF) the ignition switch 27 to turning ON (IGSWON) the ignition switch 27 in FIG. 5 and the time from the final turning OFF (IGSWOFF) of the ignition switch (not illustrated) to the final turning ON (IGSWON) of the ignition switch in FIG. 5.

Next, the start-up process of the fuel cell system of a second embodiment of the present invention will be explained with reference to the flowchart in FIG. 6.

In this embodiment, the valve open time of the purge valve 15 is determined based on the cell voltages (or total voltage) of the fuel cell before the hydrogen gas has been supplied.

In step S10, it is determined whether the cut-off valve 17 is open. When the result of the determination is "YES" (the cut-off valve 17 is open), the processing proceeds to step S17, and when the result of the determination is "NO" (the cut-off valve 17 is closed), the processing proceeds to step S11.

In step S11, the valve open time of the purge valve 15 is calculated depending on the cell voltages (total voltage) of the fuel cell 1 before the introduction of the hydrogen gas. For example, as shown in FIG. 4 of the first embodiment, the valve open time of the purge valve 15 may be set at different values depending on whether the cell voltage is above or below the lowest cell voltage, or alternatively, the valve open time may be set such that as the cell voltage becomes higher, the valve open time gradually shortens.

Such a setting is necessary because the longer the duration of the fuel cell 1 stoppage, the lower the voltage of the fuel cell 1, and the more the nitrogen gas remains due to the reaction of the remaining hydrogen gas and the oxygen gas in the air react, and thus it is necessary to set the purge valve 15 open for longer time. In this manner, the duration of the fuel cell 1 stoppage is estimated based on the cell voltage of the fuel cell 1, and based on this estimated stoppage duration, the timing of the closing of the purge valve 15 is set.

Next, in step S12, it is determined whether the calculation of the valve open time has completed. When the result of the determination is "YES" (valve open time calculation completed), the processing proceeds to step S14, and when the result of the determination is "NO" (valve open time calculation in progress), the processing proceeds to step S13.

In step S14, the opening process timer of the purge valve 15 is set; next, in step S15, the hydrogen supply start is determined; then in step S16, the cut-off valve 17 is opened, and the processing ends. In step S13, because the calculation of the valve open time is in progress, the processing is completed while the cut-off valve 17 is closed.

In addition, when the cut-off valve 17 opens, the determination in step S10 becomes "YES", and in step S17, it is determined whether the opening process timer=0. When the result of the determination is "YES" (opening process timer=0), the processing proceeds to step S19, and purge valve 15 is closed, and the processing ends. When the result of the determination is "NO" (the opening process timer≠0), the processing proceeds to step S18, the purge valve 15 is opened, and the processing ends.

Therefore, when the cut-off valve 17 is opened, hydrogen gas is supplied from the hydrogen tank 11, and the purge valve 15 is opened, the valve open time of the purge valve 15 is calculated depending on the cell voltages (total voltage) of the fuel cell 1 before the introduction of the hydrogen, and the purge valve 15 is opened only for this time. Thereby, because hydrogen gas is not needlessly consumed and the generated voltage of the fuel cell 1 does not fluctuate due to the supply of the hydrogen gas, it is possible to set the valve open time (i.e., closing timing) of the purge valve 15, and it is possible to start-up the fuel cell 1 in a short period of time. Thus, a superior starting performance of the fuel cell vehicle can be achieved.

Figure 6:
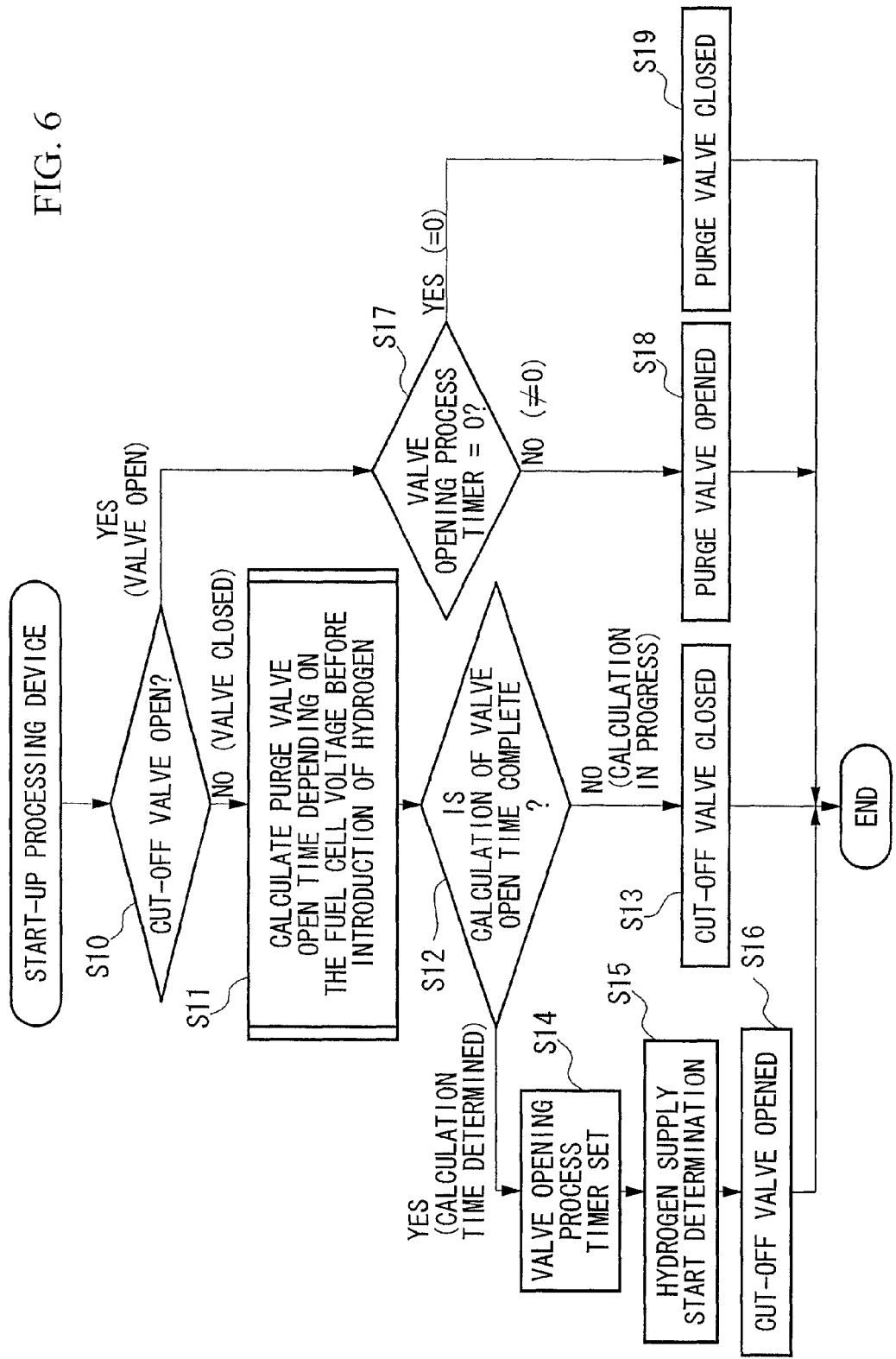
FIG. 6 is a flowchart of a second embodiment of the present invention.
Figure 7:
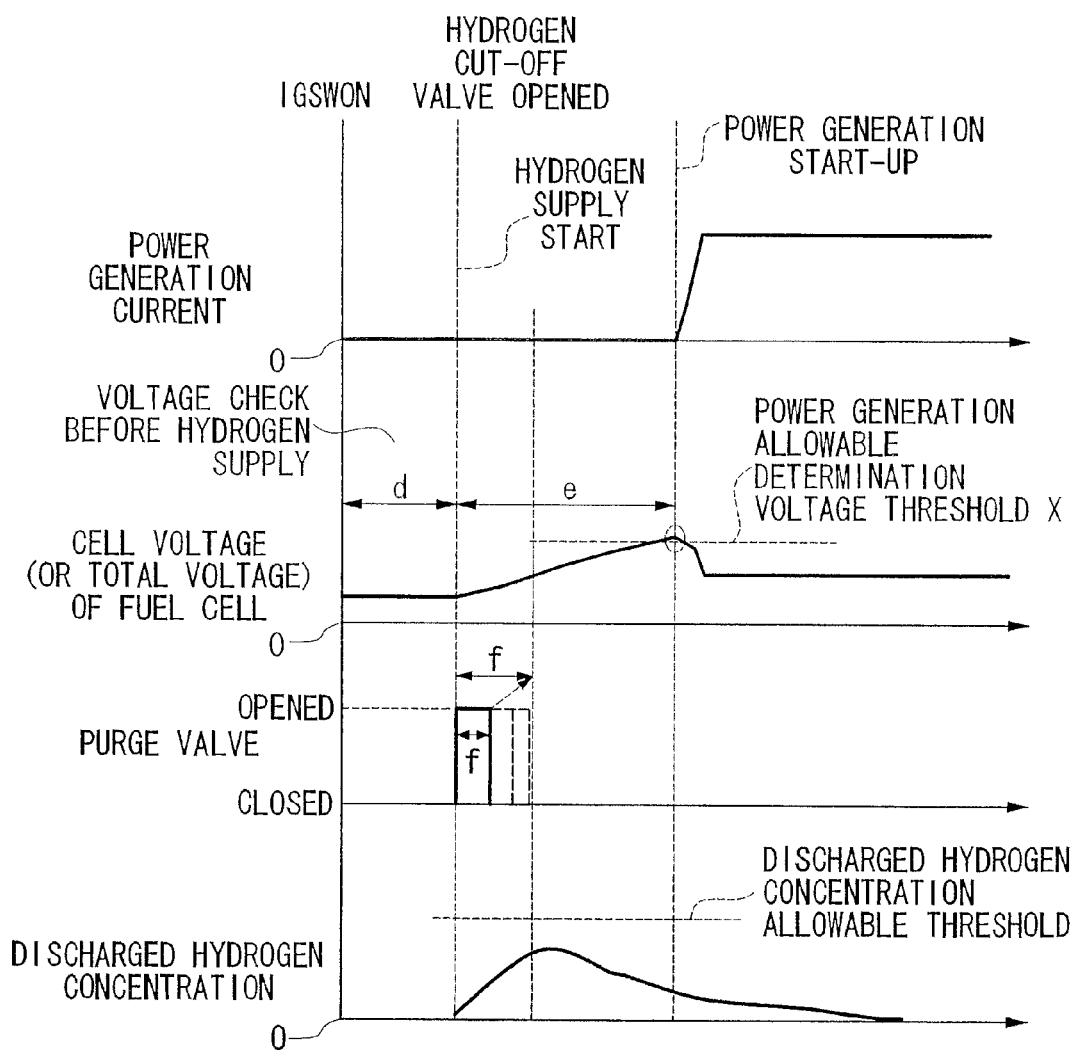
FIG. 7 is a timing chart of the second embodiment of the present invention.

FIG. 7 shows the timing chart corresponding to FIG. 6 for the second embodiment of the present invention. In this figure, when the ignition switch 27 is turned ON (IGSWON), the fuel cell 1 carries out a cell voltage check (duration "d") before the hydrogen is supplied. Thereby, the duration of the fuel cell 1 stoppage, that is, the amount of nitrogen gas remaining therein, is estimated by the voltage before the hydrogen is supplied, and it is possible to calculate the valve open time (duration "f") of the purge valve 15 in order to discharge this nitrogen gas.

Next, the cut-off valve 17 opens, the supply of hydrogen gas starts, no-load running is carried out, and a no-load voltage check is carried out (duration "e") after the hydrogen has been supplied. This no-load voltage check is identical to that of the previous embodiment, and thus the explanation thereof is omitted.

When the supply of the hydrogen gas starts, the purge valve 15 opens only during f, and due to this opening of the purge valve 15, the hydrogen gas concentration in the discharge gas processing device 10 rises. That is, after the nitrogen gas in the fuel cell 1 has been discharged, the hydrogen gas concentration starts to increase. Subsequently, when the purge valve 15 is closed, the hydrogen gas concentration is reduced due to the no-load running during which a portion of the supplied hydrogen gas is consumed due to reacting.

In addition, when the cell voltages have reached the power generation allowed determination voltage threshold X, the fuel cell 1 is connected to the load such as the motor 18, and power generation starts. Thereby, a generated current is produced, and the cell voltages (total voltage) are reduced to some extent.

Therefore, the valve open time of the purge valve 15 is calculated based on the cell voltages (total voltage) of the fuel cell 1 before the hydrogen gas has been supplied, and thus hydrogen gas is not needlessly discharged and the power generation is started more quickly. Note that, in this embodiment, the amount of remaining nitrogen gas and the amount of remaining hydrogen gas can be estimated from the voltage of the fuel cell 1 before the hydrogen is supplied and it is possible to calculate accurately the valve open time (i.e., closing timing). Thus, the point that the hydrogen gas concentration does not exceed the discharge hydrogen concentration allowable threshold is advantageous.

According to the embodiment described above, in starting-up the fuel cell system, when hydrogen gas is supplied to the fuel cell 1 and the purge valve 15 is opened, after the nitrogen gas in the hydrogen gas circulation path 13 has been replaced by hydrogen gas, the purge valve 15 is closed. Then the purge valve 15 is opened and due to the supplying of the hydrogen gas and the opening of the purge valve 15, the nitrogen gas in the system on the hydrogen gas side, which is very detrimentally influenced by the nitrogen gas, is discharged. The hydrogen gas is supplied, the nitrogen gas is replaced by the hydrogen gas in the fuel cell 1, and thereby the hydrogen gas is not needlessly used, and it is possible to prevent the time until the power generation start from becoming long due to the interference of the nitrogen gas remaining in the hydrogen gas circulation path 13. Therefore, this is advantageous in the cases in which the fuel cell 1 mounted on a vehicle that requires a superior starting performance due to frequently repeated running and stopping.

In FIG. 7, as shown by the broken lines in the part that shows the opening and closing state of the purge valve 15, the timing for the closing of the purge valve 15 can be determined according to the duration of the fuel cell 1 stoppage. Specifically, the longer the duration of the fuel cell 1 stoppage, the more the delay of the timing for closing the purge valve 15, and thus it is possible to guarantee the time during which the nitrogen gas is replaced by the hydrogen gas. Thus, it is possible to close the purge valve 15 accurately at the point in time when the nitrogen gas remaining in the hydrogen gas circulation path 13 has been replaced by the hydrogen gas. This time is determined depending on the duration of the fuel cell 1 stoppage.

In addition, the duration of the fuel cell 1 stoppage can be estimated based on the temperature of the of the fuel cell 1 or the cell voltages and total voltage of the fuel cell 1, and thus focusing on the facts that the longer the duration of the fuel cell 1 stoppage, the lower the temperature of the fuel cell 1 becomes and the lower the generated voltage becomes, it is possible to estimate accurately the duration of the fuel cell 1 stoppage. This time determines the amount of nitrogen gas that is to be replaced by hydrogen gas.

In addition, because the timing at which the purge valve 15 is closed is also determined by the hydrogen gas concentration included in the discharge gas from the hydrogen gas circulation path 13, the discharged hydrogen gas concentration is directly used. Thereby, the needless use of hydrogen gas can be suppressed to a minimum and it is possible to prevent the lengthening of the time until the power generation start due to the interference of the nitrogen gas remaining in the hydrogen gas circulation path 13. Thus, it is possible to increase the starting performance of the fuel cell vehicle.

Figure 8:
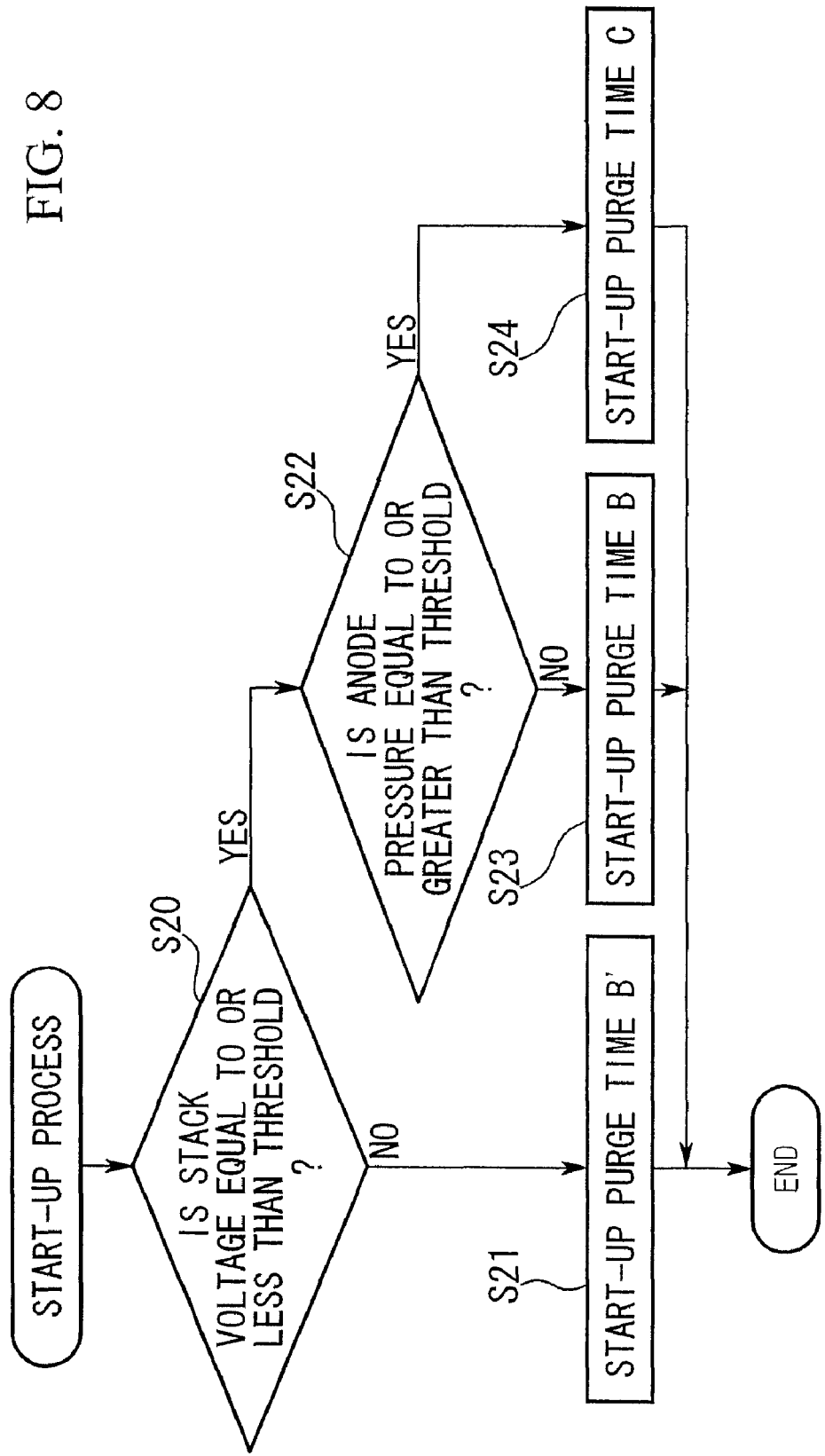
FIG. 8 is a flowchart for a third embodiment of the present invention.

Next, the start-up process of the fuel cell system according to the third embodiment of the present invention will be explained with reference to the flowchart in FIG. 8.

In this embodiment, the valve open time of the purge valve 15 is determined based on the stack voltage (total voltage or cell voltages) of the fuel cell and the anode pressure.

Figure 9:
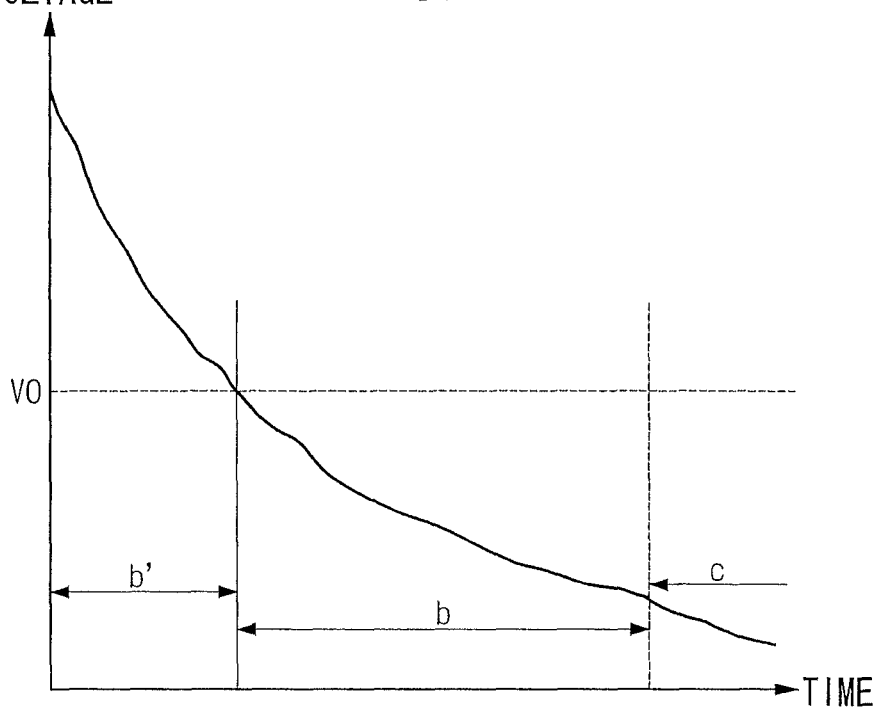
FIG. 9 is a graph of the third embodiment of the present invention.

In step S20, it is determined whether the stack voltage measured by the voltage sensor 24 is equal to or less than the threshold V0 (refer to FIG. 9). When the result of the determination is "YES" (the stack voltage is equal to or less than the threshold V0), the processing proceeds to step S22, and when the result of the determination is "NO" (the stack voltage is greater then the threshold V0), the processing proceeds to step S21.

In step S21, the valve open time b' of the purge valve 15 is calculated depending on the stack voltage of the fuel cell 1 before the introduction of the hydrogen gas. This calculation is carried out based on the graph in FIG. 9. This graph shows the stack voltage as a function of the duration of the fuel cell stoppage. In addition, there is a separate map of the stack voltages and opening times, and when the stack voltage is higher than the threshold V0, the opening time is set to b'. As described above, because it is possible to make the determination that the lower the voltage of the fuel cell 1, the longer the duration of the fuel cell 1 stoppage, the opening time b' is set to a time that is shorter than the opening time "b" and the opening time c, described above. In this manner, the duration of the fuel cell 1 stoppage is estimated based on the stack voltage of the fuel cell 1, and based on this estimated stoppage duration, the timing of the closing of the purge valve 15 is set.

Figure 10:
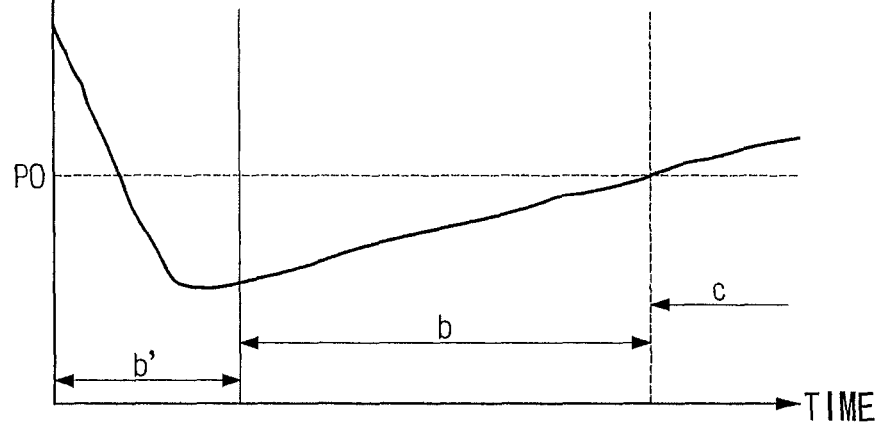
FIG. 10 is another graph of the third embodiment of the present invention.

In step S22, it is determined whether the anode pressure measured by the pressure sensor 26 is equal to or greater than the threshold P0 (refer to FIG. 10). When the result of the determination is "YES", the anode pressure is equal to or greater than the threshold P0, and the processing proceeds to step S24. When the result of the determination is "NO", the anode pressure is less than the threshold P0, and the processing proceeds to step S23. In step S23, the opening time "b" of the purge valve 15 is calculated. In addition, in step S24, the opening time c of the purge valve 15 is calculated. The calculation of these opening times b and c are carried out based on the graph in FIG. 10. This graph shows the anode pressure as a function of the duration of the fuel cell stoppage. In addition, there is a separate map of the anode pressure and the opening time, and when the anode pressure is smaller than the threshold P0, the opening time is set to "b", and when the anode pressure is equal to or greater than the threshold P0, the anode pressure is set to "c". Here, although the opening time "b" is shorter than the opening time "c", the opening time is set to a time longer than the opening time b' described above.

The time setting focuses on the following points. Specifically, in the case in which the duration of the fuel cell stoppage is comparatively short, the hydrogen remaining in the hydrogen gas circulation path 13 reacts with the hydrogen of the hydrogen gas remaining in the system, and thus the pressure in the hydrogen gas circulation path 13 decreases. However, the duration of the fuel cell stoppage is comparatively long, the nitrogen gas remaining in the oxygen gas system diffuses back into the fuel gas system, and thus the pressure of the hydrogen gas circulation path 13 increases. Therefore, by focusing on such a point, it is possible to estimate the duration of the fuel cell stoppage with high precision, and thus it is possible to discharge the nitrogen gas from the system on the fuel gas side and fill the system with fuel gas. Thus, the fuel gas is not needlessly used, and it is possible to prevent more reliably the lengthening of the time until the power generation start due to the interference of the nitrogen gas remaining in the hydrogen gas circulation path 13.

In the embodiment described above, the setting of the timing at which the opened purge valve 10 is closed was explained, but in the following embodiments, the setting of the timing at which the purge valve 10 is opened will be explained.

Figure 11:
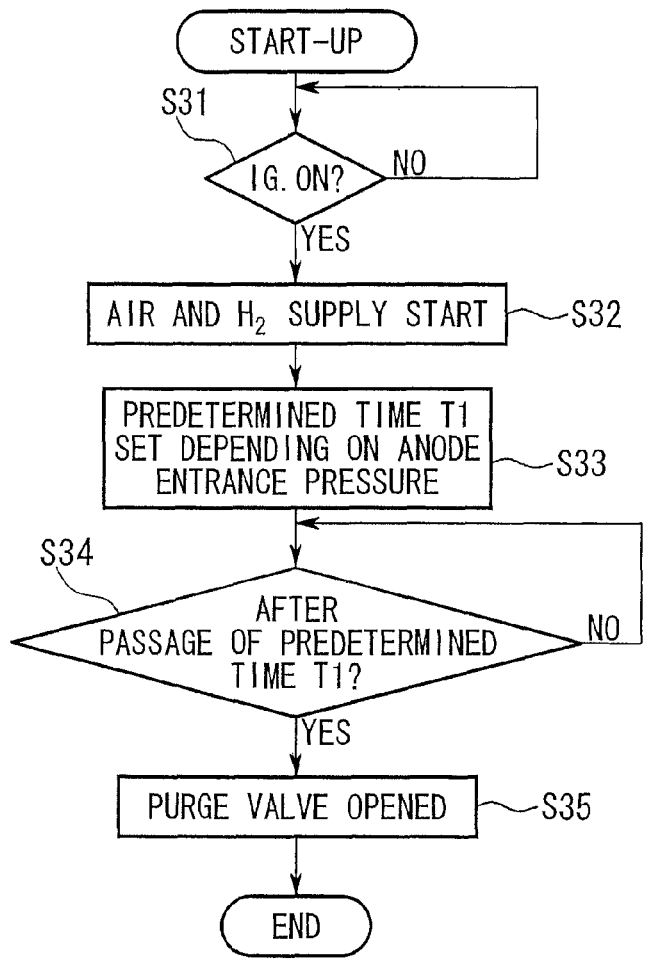
FIG. 11 is a flowchart of a fourth embodiment of the present invention.

The start-up process of the fourth embodiment of the present invention will be explained with reference to FIG. 11. In step 31 of FIG. 11, it is determined whether the ignition switch 27 (refer to FIG. 1) is ON. When the ignition switch 27 is ON (the result is "YES"), the processing proceeds to step S32, and when the ignition switch 27 is OFF (the result is "NO"), the processing returns to step S31, and the processing is repeated.

Next, in step S32, the cut-off valve 17 is closed, and at the same time the hydrogen pump 14 is actuated and hydrogen gas from the hydrogen tank 11 is supplied to the anode 3 of the fuel cell 1 via the hydrogen gas supply path 12. Then the compressor 7 is actuated, and at the same time, a pressure regulating valve (not illustrated) is opened, air is supplied to the cathode 4 of the fuel cell 1 via the air supply path 8, and the processing moves to step S33.

In step S33, the pressure P1 of the hydrogen gas in the entrance side of the anode 3 is measured by the pressure sensor 26. That is, the pressure sensor 26 measures the pressure before the ignition switch 27 is turned ON and the reacting gases are supplied to the anode 3 of the fuel cell 1, that is, the pressure of the hydrogen gas circulation path 13 while power generation is stopped. The pressure in the hydrogen gas circulation path 13 fluctuates depending on the duration of the fuel cell vehicle stoppage. Specifically, as shown in FIG. 10, because the hydrogen gas in the hydrogen gas circulation path 13 is consumed in the fuel cell while the vehicle is stopped, the pressure in the hydrogen gas circulation path 13 tends to be reduced, and the pressure may fall below atmospheric pressure.

Subsequently, although the pressure in the hydrogen gas circulation path 13 increases accompanying the penetration of the nitrogen and the like in the air remaining in the air electrode (cathode) 4 into the hydrogen gas circulation path 13 via the solid polymer electrolyte membrane 2, the pressure is lower than atmospheric pressure. In this manner, the pressure in the hydrogen gas circulation path 13 fluctuates depending on the duration the fuel cell vehicle stoppage. In the present embodiment, the duration of the fuel cell 1 stoppage is estimated based on the pressure in the hydrogen gas circulation path 13, and the timing of the opening of the purge valve 15 is set based on this estimated stoppage duration.

Figure 12:
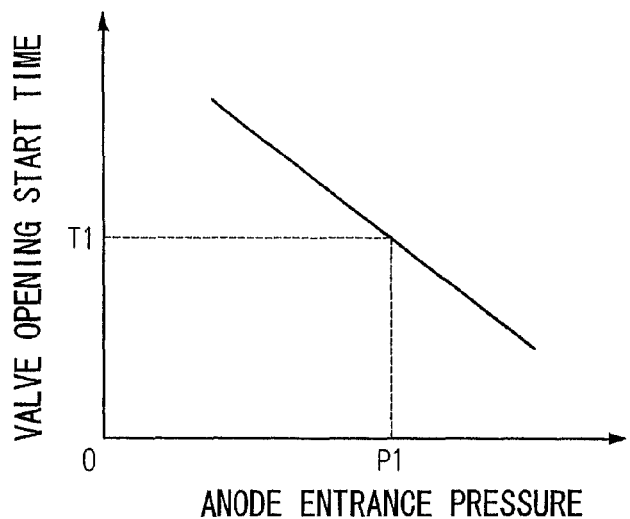
FIG. 12 is a characteristic graph showing the relationship between the anode entrance pressure and the purge valve opening and closing time according to a fourth embodiment.

Here, an ECU 19 has the characteristic diagram shown in FIG. 12, and based on this characteristic line, a predetermined time (opening start time) T1 is calculated depending on the pressure P1 of the hydrogen gas. In this characteristic diagram, as will be described below, the backflow of impure gases into the hydrogen gas circulation path 13 can be prevented, and thus setting is carried out such that the lower the pressure P1 of the hydrogen gas circulation path 13, the longer the opening valve start time of the cut-off valve 17. In addition, the ECU 19 has an opening starting time setting device that sets the time T1 (refer to FIG. 13) from the opening start time of the cut-off valve 17 to the opening start time of the purge valve 15 depending on the measured value (pressure P1) measured by the pressure sensor 26.

Next, in step S34, it is determined whether a predetermined time T1 has passed from the opening of the cut-off valve 17. When the predetermined time T1 has passed (when the determination is "YES"), the pressure P1 of the hydrogen gas is treated as having risen up to "atmospheric pressure+several kPa" (refer to FIG. 13) based on a sufficient amount of hydrogen gas having been supplied to the hydrogen gas circulation path 13 from the hydrogen tank 11, and the processing proceeds to step S35. When the predetermined time T1 has not passed (when the determination is "NO"), the pressure P1 of the hydrogen gas is treated as not having reached "atmospheric pressure+several kPa", and the processing in step S34 is repeated.

In addition, in the final step S35, the purge valve 15 is maintained in an opened state for only the predetermined time T2 (refer to FIG. 13), determined in advance by using, for example, a timer (not illustrated), and in the meantime, the hydrogen gas in the hydrogen gas circulation path 13 is purged, and the opening process of the purge valve 15 is completed.

The predetermined time T2 is set to a time that is sufficient to replace the impure gases such as nitrogen that are assumed remain in the hydrogen gas circulation path 13, and the predetermined time T2 is set using any of the methods described in the first through third embodiments described above. For example, the predetermined time T2 can be set depending on parameters such as the pressure of the hydrogen gas circulation path 13, the cell voltages (total voltage) of the fuel cell 1, the coolant water temperature, or a combination thereof.

In addition, the purge valve 15 can opened depending on the concentration released by the purge valve 15. Here, the impure gases such as nitrogen gas remaining the hydrogen gas circulation path 13 are forced out by the oxygen supplied by the hydrogen tank 11. At this time, the concentration of the hydrogen discharged by the purge valve 15 is measured, and when this concentration exceeds a predetermined concentration, the impure gases in the hydrogen gas circulation path 13 are assumed to be sufficiently discharged (that is, the nitrogen in the hydrogen gas circulation path 13 has been replaced by the oxygen gas), and at this timing, the purge valve 15 is closed.

Figure 13:
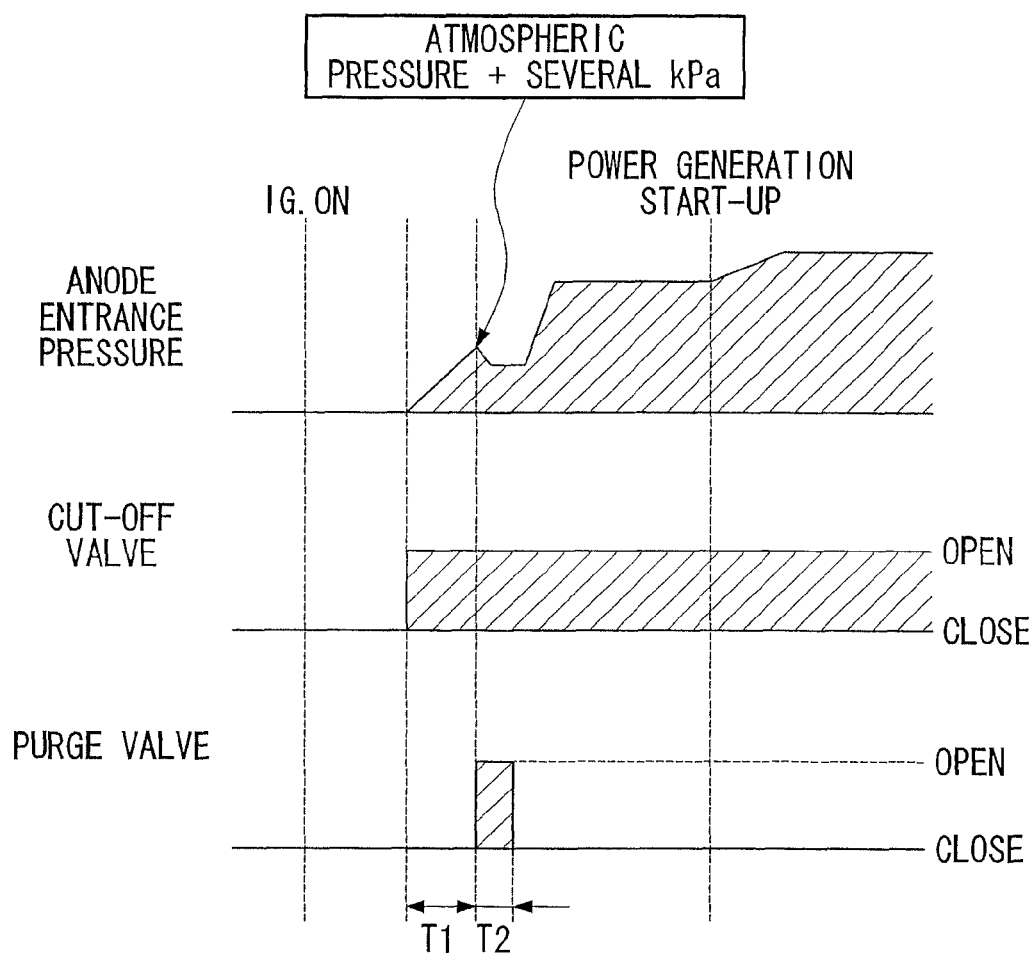
FIG. 13 is a timing chart showing the relationship between the anode entrance pressure, the cut-off valve, and the purge valve according to a fourth embodiment.

In this manner, in the present embodiment, as shown in FIG. 13, before the power generation start by the fuel cell 1, while the anode entrance pressure (P1) has reached "atmospheric pressure+several kPa", it is possible to carry out the purging in the hydrogen gas circulation path 13 by the purge valve 15, it is possible to prevent the backflow of impure gases in the air into the hydrogen gas circulation path 13, and it is possible to carry out the purging of the hydrogen gas circulation path 13 smoothly.

Therefore, before the power generation start, the impure gases remaining in the anode 3 space of the fuel cell 1 are efficiently eliminated, and thereby it is possible to replace the impure gases in the hydrogen gas circulation path 13 with high concentration hydrogen gas, and it is possible to carry out the start-up of the fuel cell 1 smoothly. Note that the "several kPa" in the expression "atmospheric pressure+several kPa" is determined with the aim of preventing the backflow of impure gases and the like.

Figure 14:
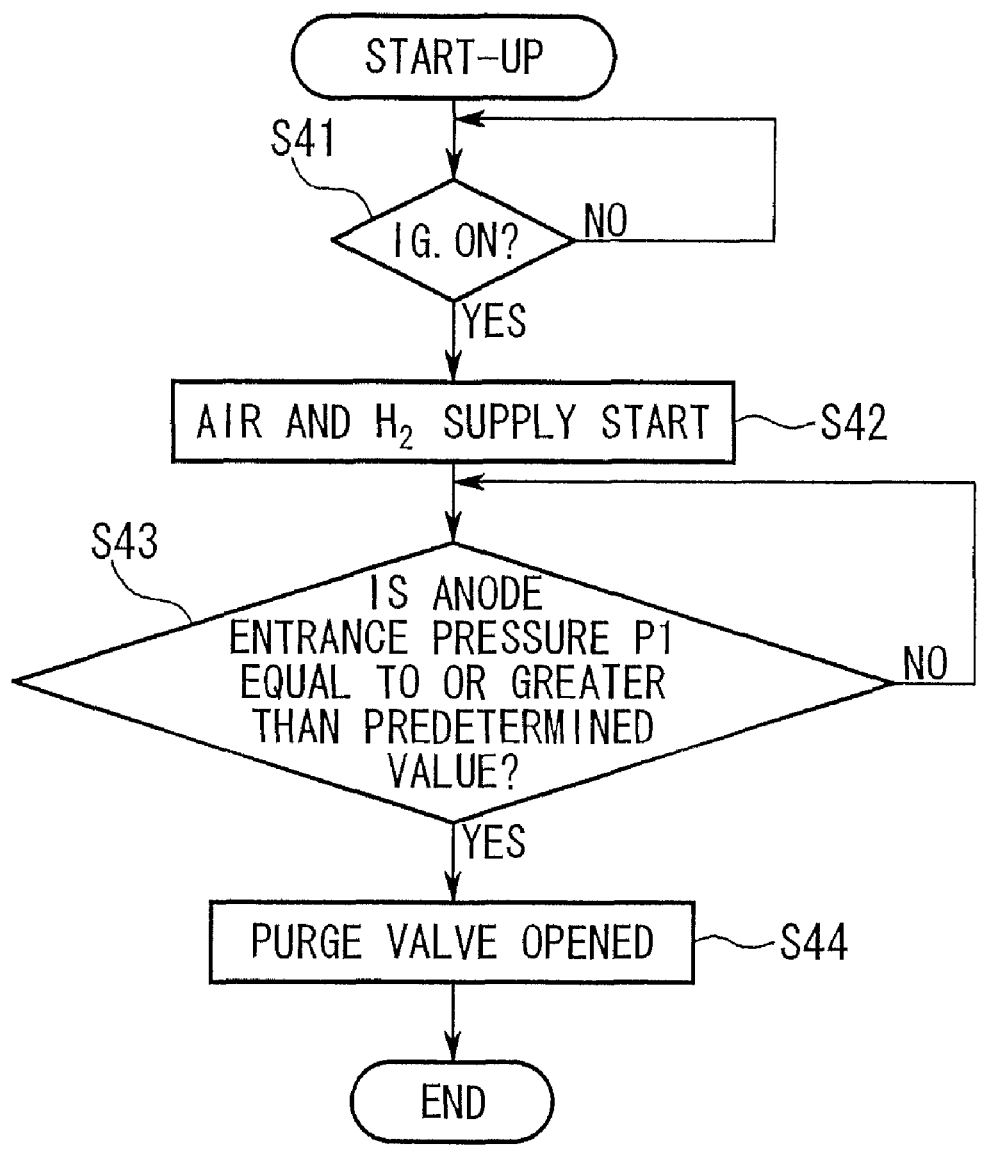
FIG. 14 is a flowchart of the fifth embodiment of the present invention.

The start-up process of the fifth embodiment of the present invention will be explained with reference to FIG. 14.

First, in step S41, it is determined whether the ignition switch 27 is ON, and when it is ON (the result is "YES"), the processing proceeds to step S42, and when it is OFF (the result is "NO"), the processing returns to step S41, and the processing repeats.

Next, in step S42, the cut-off valve 17 is opened, the hydrogen pump 14 is activated, and the hydrogen gas from the hydrogen tank 11 is supplied to the anode 3 of the fuel cell 1 via the hydrogen gas circulation path 12. Then the compressor 7 is activated, the pressure regulating valve (not illustrated) is opened, air is supplied to the cathode 4 of the fuel cell 1 via the air supply path 8, and the processing returns to step S43.

In step S43, the pressure P1 of the hydrogen gas in the entrance side of the anode 3 is measured by the pressure sensor 26, and it is determined whether the pressure P1 of the hydrogen gas is larger than a predetermined value (atmospheric pressure+several kPa) that is decided in advance. As in the fourth embodiment, the ignition switch 27 is turned on, and this pressure sensor 26 measures the pressure before the reacting gases are supplied to the anode 3 of the fuel cell 1, that is, the pressure of the hydrogen gas circulation path 13 while the power generation is stopped. The pressure of the hydrogen gas circulation path 13 fluctuates depending on the duration of the fuel cell vehicle stoppage. That is, as shown in FIG. 10, because the hydrogen gas in the hydrogen gas circulation path 13 is consumed while the vehicle is stopped, the pressure in the hydrogen gas circulation path 13 tends to be reduced, and the pressure may fall below atmospheric pressure. Subsequently, although the pressure in the hydrogen gas circulation path 13 rises accompanying the penetration of the atmospheric nitrogen in the air that remains at the air cathode (cathode) 4 via the solid polymer electrolyte membrane 2, the pressure may be lower than atmospheric pressure. In this manner, the pressure in the hydrogen gas circulation path 13 fluctuates depending on duration of the fuel cell vehicle stoppage. In the present embodiment, the duration of the fuel cell 1 stoppage is estimated based on the pressure in the hydrogen gas circulation path 13, and the timing of the opening of the purge valve 15 is set based on this estimated stoppage duration. In addition, the ECU 19 according to the present embodiment has a determination device that determines whether the measured value of the pressure sensor 26 is equal to or greater than a predetermined value.

In addition, in step S43, when the pressure P1 in of the hydrogen gas is higher than the predetermined value "atmospheric pressure+several kPa" (the result is "YES"), the processing proceeds to step S44, and when it is lower, the processing returns to step S43, and the processing is repeated.

In step S44, the purge valve 15 is maintained in an open state for a certain time, and during this time, the hydrogen gas in the hydrogen gas circulation path 13 is purged, and the processing ends. That is, the ECU 19 according to the present embodiment has a hydrogen purge valve device that maintains the purge valve 15 in an open state when the pressure P1 of the hydrogen gas measured by the pressure sensor 26 is equal to or greater than a predetermined value.

As in the fourth embodiment, the purge valve open time here can be set depending on, for example, the pressure in the hydrogen gas circulation path 13, the voltage of the fuel cell 1, the temperature of the coolant water or the like, and in this case, the purge valve 15 is closed after this opening time has passed. The opening time of the purge valve 15 is set as a time sufficient for the replacement of impure gases such as nitrogen assumed to be remaining the in the hydrogen gas circulation path 13 by hydrogen.

In addition, the purge valve 15 can be closed depending on the hydrogen gas concentration released by the purge valve 15. Here, impure gases such as nitrogen gas remaining in the hydrogen gas circulation path 13 are forced out by the hydrogen supplied from the hydrogen tank 11, and discharged from the purge valve 15. At this time, the concentration of the hydrogen discharged by the purge valve 15 is measured, and when this concentration has exceeded a predetermined concentration, the impure gases in the hydrogen gas circulation path 13 have been sufficiently discharged (that is, the nitrogen in the hydrogen gas circulation path 13 has been replaced by the hydrogen gas), and at this timing, the purge valve 15 is closed.

In the present embodiment structured in this manner as well, before the start of the power generation by the fuel cell 1, while the anode entrance pressure (P1) has reached "atmospheric pressure+several kPa" in advance, it is possible to carry out the purging in the hydrogen gas circulation path 13 by the purge valve 15, it is possible to prevent the backflow of impure gases in the air into the hydrogen gas circulation path 13, and it is possible to attain the operation and effects that are identical to that of the fourth embodiment.

Note that the present invention is not limited by the embodiment described above. For example, the invention is not limited to a fuel cell mounted in a fuel cell vehicle.

In addition, it is possible to use direct measurement of the duration of the fuel cell 1 stoppage in order to determine the closing timing for the purge valve 15. This case can be handled by more quickly setting the timing at which the purge valve 15 is closed the shorter the duration of the fuel cell 1 stoppage.

Furthermore, it is also possible to determine the timing at which the purge valve 15 is closed by using any one of the temperature of the fuel cell 1, cell voltages (total voltage), or the fuel gas concentration included in the discharge gas from the hydrogen gas circulation path 13, or any arbitrary combination thereof. In addition, the fuel can be any one that will react with the oxygen in the compressed air. For example, it is possible to supply reformed hydrogen that is generated by reforming organic hydrous compounds by using a reformer.

What is claimed is:

1. A start-up method for a fuel cell system that includes a fuel cell that carries out power generation by the electrochemical reaction between a fuel gas and the oxygen gas in the air; a fuel gas discharge path and a fuel gas supply path that are connected to the fuel cell; a fuel gas circulation path that connects the fuel gas discharge path to the fuel gas supply path; and a purge valve provided on the fuel gas circulation path in order to discharge the circulating fuel gas from the fuel gas circulation path, the method comprising the steps of:

starting the supply of the fuel gas to the fuel cell;

opening the purge valve after the start of the supplying of the fuel gas;

calculating a valve open time depending on a voltage of the fuel cell or a temperature of the fuel cell;

comparing the valve open time to a time that passed from the opening of the purge valve;

if the calculated valve open time is less than the time that passed from the opening of the purge valve, closing the purge valve; and if the calculated valve open time is greater than the time that passed from the opening of the purge valve, closing the purge valve depending on concentration of the fuel gas included in the discharge gas from the fuel gas circulation path.

2. A start-up method for a fuel cell system according to claim 1, further comprising the step of:

starting the power generation of the fuel cell after the closing of the purge valve.

* * * * *

UNITED STATES PATENT AND TRADEMARK OFFICE
CERTIFICATE OF CORRECTION

PATENT NO. : 8,142,947 B2
APPLICATION NO. : 13/023270
DATED : March 27, 2012
INVENTOR(S) : Masanori Hayashi et al.

Page 1 of 1

It is certified that error appears in the above-identified patent and that said Letters Patent is hereby corrected as shown below:

ON THE TITLE PAGE:

Column 1, please insert the following new fields:

Item --(63) Division of application No. 11/805,182, filed on May 21, 2007, now Patent No. 7,910,254, which is a division of application No. 10/723,622, filed on November 25, 2003, now Patent No. 7,282,286--

Item --(30) Foreign Application Priority Data:
November 28, 2002 (JP)....... 2002-346335
November 29, 2002 (JP)....... 2002-347667
October 23, 2003 (JP) .......... 2003-363593--

Signed and Sealed this
Third Day of July, 2012

David J. Kappos
*Director of the United States Patent and Trademark Office*